United States Patent [19]

Vargiu et al.

[11] 4,169,937

[45] Oct. 2, 1979

[54] METHOD FOR PREPARING A GRANULAR THERMOSETTING MOULDING COMPOSITION CONTAINING A NOVOLAK HAVING MODIFIED SURFACE CHARACTERISTICS

[75] Inventors: Silvio Vargiu, Casatenovo; Pier L. Manzoni, Codogno; Mario Bernasconi, Maleo; Antonio Parodi, Monza, all of Italy

[73] Assignee: Societa' Italiana Resine S.I.R. S.p.A., Milan, Italy

[21] Appl. No.: 748,359

[22] Filed: Dec. 7, 1976

[30] Foreign Application Priority Data

Dec. 19, 1975 [IT] Italy .............................. 30492 A/75

[51] Int. Cl.² .............................................. C08G 8/10
[52] U.S. Cl. .................................... 525/493; 260/17.2; 260/19 N; 260/38; 528/492; 528/501; 528/502; 528/127; 528/129; 528/159; 528/162; 528/493; 528/495

[58] Field of Search ...................... 260/38, 17.2, 59 R, 260/50; 528/480, 492, 493, 495

[56] References Cited

U.S. PATENT DOCUMENTS

| | | | |
|---|---|---|---|
| 2,265,688 | 12/1941 | D'Alelio et al. ..................... | 528/495 |
| 2,886,540 | 5/1959 | McNaughton et al. ............ | 260/17.2 |
| 3,006,883 | 10/1961 | Cambron ................. | 260/50 |
| 3,412,068 | 11/1968 | Gemmill et al. ..................... | 260/50 |
| 4,105,604 | 8/1978 | Vargiu et al. ........................ | 260/17.2 |

*Primary Examiner*—Harold D. Anderson
*Attorney, Agent, or Firm*—Sughrue, Rothwell, Mion, Zinn and Macpeak

[57] ABSTRACT

A granular thermosetting composition free from a tendency to release dust and transformable into molded articles free from surface defects, is obtained by forming the composition into granules of from 2 to 8 mm in size and mixing said granules with from 0.5 to 3 wt.% of one or more substances, in liquid form, chosen from acetone, phenol, aniline and reaction products of phenol with styrene.

5 Claims, No Drawings

METHOD FOR PREPARING A GRANULAR THERMOSETTING MOULDING COMPOSITION CONTAINING A NOVOLAK HAVING MODIFIED SURFACE CHARACTERISTICS

The present invention relates to the preparation of a granular thermosetting composition including a Novolak phenolic resin, free from a tendency to release dust and able to be formed into finished parts by injection moulding.

Moulding compositions including a Novolak phenolic resin constituted by a condensation product of phenol with formaldehyde which hardens under heat in the presence of substances like hexamine, are known in the art. Other constituents of these compositions are hardening catalysts, usually chosen from among the oxides of alkaline earth metals, inert fillers and possibly also small amounts of lubricants, dyes and pigments.

It is known that these compositions melt and become fluid when heated, then harden irreversibly at a higher temperature.

Compositions containing a Novolak phenolic resin can be moulded by the injection technique, in so far as they have a sufficiently long working time in the fluid state (or plastic life), and provided that they harden completely at temperatures higher than those at which these compositions become fluid.

In order to improve their thermal stability in the fluid state, it is usual to add to the compositions small amounts of oxides and acids of boron, possibly combined with hexamine, for example boric anhydride, orthoboric and metaboric acids and hexamine metaborate.

According to our co-pending Italian patent application No. 30494-A/75 a stabilizer-catalyst mixture is added to the compositions under discussion. This mixture is made up of an amine chosen from aliphatic compounds having two or more amino groups ($NH_2$), aromatic compounds having one amino group linked to an aromatic ring and aromatic compounds having two or more amino groups linked to one or more aromatic rings, and metaboric or orthoboric acid.

By adding such a mixture, it is possible to obtain moulding compositions having the following properties:

a capacity to change into the fluid state within a temperature range in which premature cross-linking and hardening do not occur appreciably;

a long period of stability in the fluid state;

greater flowability in the fluid state;

a capacity to harden quickly and completely at temperatures higher than those needed to render the composition fluid.

The moulding compositions must be in a physical form suitable for working and transformation into moulded articles.

For this purpose the compositions are generally granulated.

Thus, according to a known method, the Novolak phenolic resin and all the other constituents of the composition are homogenized in a suitable mixer, and the homogenized mixture is calendered and transformed into a sheet. The latter is crushed and the granules sieved to recover the fraction having the required size.

According to another known method, the composition is melted in a screw extruder and the extrudate is cooled and cut into granules of uniform size.

In both cases the resulting granules release fine dust with consequent pollution of the working surroundings.

Consequently, it was suggested to treat the granules with suitable substances capable of forming a coating film.

Although such a method on the one hand prevents the release of dust, on the other hand it leads to a worsening on the aesthetic characteristics of the manufactured articles on account of their opaqueness and the formation of surface stains.

This fact does not allow the use of granular moulding compositions thus treated in various fields of application, such as for example, in that of hygienic-sanitary articles.

It has now been found that it is possible to avoid these drawbacks and to prepare compositions suitable for injection moulding, in the form of granules which do not release dust and which can be transformed into moulded articles free from opaqueness and from other surface defects.

Thus, the invention provides a process for preparing a granular thermosetting moulding composition including a Novolak phenolic resin, characterized by forming said molding composition into granules of from 2 to 8 mm in size and mixing said granules with an amount of from 0.5 to 3 wt.%, based on the weight of the granules, of one or more substances chosen from acetone, phenol, aniline and reaction products of styrene with phenol, at a temperature such as to maintain said substances in liquid form and for a period such as to ensure absorption of said substances by said granules.

In practice, the granules and the substance in liquid form are loaded into a suitable mixer, and the whole is mixed, generally at ambient temperature (20°–30° C.) or approximately ambient temperature, for a period sufficient to ensure homogenization.

Following the treatment described, the granules no longer release dust during handling, and the granular compositions treated in this way produce manufactured articles free from opaqueness and other surface defects when moulded.

The cause of such behaviour is not clear, although it is probable that following the treatment described, changes occur in the surface of the granules due to an initial dissolving caused by the substance added, followed by a solidification of the dissolved portion. In this way, a thin surface layer would be formed on the granules resistant enough to prevent the release of dust.

Moreover, this surface change does not affect the other characteristics of the composition in any way. The latter, in fact, is formed by moulding into manufactured articles free from the defects previously mentioned.

In this it differs from the granular compositions of the prior art which were coated with a film. Moreover, the treatment of the present invention is simple as well as efficient, and the substances required for this process are not costly.

The moulding composition suitable for the purposes of the present invention, generally contain from 15 to 50 wt.% of Novolak phenolic resin, from 3 to 10 wt.% of hexamine, from 0.5 to 2 wt.% of alkaline earth metal oxide and one or more inert fillers. The moulding composition generally contains small amounts of conventional additives, such as lubricants, dyes and pigments.

The Novolak phenolic resin is usually obtained by condensation of formaldehyde with phenol in a molar ratio of from 0.8:1 to 0.98:1, in the presence of a mineral or organic acid as catalyst.

The alkaline earth metal oxide is preferably calcium or magnesium oxide.

The inert fillers can be of an organic or mineral nature, such as for example, wood flour, cellulose, organic fibres and tissues, paper fibre, asbestos, mica, fluorite, talc, diatomaceous earth and rock flour.

The composition generally contains from 0.5 to 3 wt.% of lubricant, preferably selected from waxes, stearic acid and its esters, and zinc, calcium and magnesium stearates.

The composition preferably contains from 1 to 4 wt.% of the aforesaid stabilizer-catalyst mixture, where the ratio between the number of amino groups and the number of acid equivalents in said mixture is from 0.01:1 to 0.3:1.

The composition may be reduced to granules by means of the calendering or extrusion technique previously described, or by any other method known in the art.

According to the present invention, the granules are mixed with one or more of the substances previously defined, in the liquid form, added in an amount of from 0.5 to 3% by weight with respect to the weight of the granules.

It should be noted that an amount of added substance lower than 0.5% by weight does not produce useful results, since the granules keep their tendency to release dust.

Amounts higher than 3% by weight are harmful since they spoil the appearance of the resulting manufactured articles.

The best results are obtained with an amount of substance of from 1 to 1.5% by weight, based on the weight of the granules.

Mixing of the granules and the added substance is generally carried out at ambient temperature (20°–30° C.), although it can be carried out within a wider range, but in each case at temperatures lower than the boiling point of the added substance. The products of the reaction of phenol with styrene are obtained by interaction of the two compounds in the presence of an acid catalyst, and they generally have a density at 25° C. of 1.080–1.087, a refractive index $n_D^{25}$ of 1.577–1.584, and a viscosity at 25° C. of 50–62 cps.

The mixing period is generally of the order of 5–30 minutes.

EXAMPLE 1 (comparative)

A moulding composition is prepared having the following composition, given in parts by weight: Novolak phenolic resin 40.0, hexamine 6.8, magnesia 1.0, lime 0.5, stearin 1.0, zinc stearate 1.5, induline 1.8, diatomaceous earth 6.0, talc 6.0, wood flour 33.2, triethylenetetramine 0.5, orthoboric acid 1.5.

The Novolak phenolic resin used is obtained by condensing formaldehyde with phenol in a 0.91:1 molar ratio, in an aqueous medium and in the presence of oxalic acid as catalyst. This resin has the following properties:

| | |
|---|---|
| - viscosity at 25° C. in ethanol in a 1:1 weight ratio: | 60 cps |
| - melting point (capillary): | 69° C. |

The composition prepared in this way is loaded into a screw-extruder, heated uniformly to 130° C. and extruded. The extrudate is cooled and cut into regular granules 6 mm in size.

The granules are subjected to the following tests:
(A) Disc fluidity;
(B) Flow index;
(C) Hardening time;
(D) Aesthetic quality of the moulded articles.

More particularly:

(A) The "disc fluidity" is determined in the following way:

A hydraulic press equipped with a pressure reducer, and a disc-shaped die with diameter of 34 cm, subdivided into seven concentric circles, is used.

The plates of the press are heated electrically, and the operation conditions are as follows: temperature 160°–165° C.; total pressure applied 30,000 kg; time 60 seconds.

50 grams of the composition under examination are placed at the centre of the die and the speed of descent of the piston in its final closing step is regulated to 0.3 cm/sec. The time between the placing of the composition in the die and the application of pressure is 10±0.5 seconds. After 60 seconds the sample is extracted in the form of a thin disc the diameter of which depends on the fluidity of the composition under examination.

The fluidity, or flowability, of the composition being examined is expressed as the number of circles impressed on the disc excluding the first, taken as zero value.

(B) The flow index is determined in the following way:

A hydraulic press is used equipped with a pressure reducer and an open chromium plated die in the form of a small beaker, type UNI 4272.

The plates of the press are heated electrically and the press is operated under the following conditions: temperature 160°–165° C., total pressure applied 5,000 kg.

In particular, a metered quantity of the composition under examination is placed in the cavity of the die and pressure is applied. At the moment when the needle of the manometer, connected to the press, shows an increase in pressure, the chronometer is started. When the upper plate of the press has finished its descent the chronometer is stopped. The intervening time, expressed in seconds, is the flow index.

(C) Operation is as in test B. The time between the closing of the press and the formation of a small beaker free from surface defects (bubbles), expressed in seconds, is the hardening time.

(D) The moulded objects are observed from the point of view of opaqueness and surface defects (stains). Valuation is expressed on an empirical scale from 1 to 10, in which 10 corresponds to a moulded object free from the defects described.

The results of the experiments carried out on the granular composition of Example 1 are shown in the Table.

The granular composition has a tendency to release a fine dust.

EXAMPLE 2

0.5 kg of the granules of Example 1 are placed in a rotating homogenizer, 5 grams of acetone are added and the whole is mixed for 10 minutes. The granules are then subjected to Tests A to D.

EXAMPLES 3–10.

One proceeds as for Example 2, adding: 10 grams of acetone (Example 3), 5 grams of phenol (Example 4), 10 grams of phenol (Example 5), 5 grams of the reaction product of phenol with styrene previously described (Example 6), 5 grams of aniline (Example 7), a mixture of 2.5 grams of aniline and 2.5 grams of phenol (Example 8), a mixture of 2.5 grams of aniline and 2.5 grams of the reaction product of phenol with styrene (Example 9), a mixture of 2.5 grams of aniline and 2.5 grams of acetone (Example 10). The granules are then subjected to Tests A to D.

EXAMPLES 11–12 (comparative)

One proceeds as for Example 2, adding 5 and 10 grams respectively of a mixture of 50% by weight of zinc stearate and 50% by weight of dibutyl phthalate. The granules are then subjected to Tests A to D.

All the granules treated in Examples 3–12 are free from the tendency to release dust.

The results of the tests are summarized in the Table. It should be noted that the treatment of Examples 3–10 does not bring about sensible variations in the properties of the composition or moulded articles.

Table

|  | A | B | C | D |
|---|---|---|---|---|
| Example 1 | 6½ | 5 | 45–50 | 10 |
| Example 2 | 6½ | 3 | 45 | 9 |
| Example 3 | 6½ | 3 | 45 | 8 |
| Example 4 | 6½ | 3 | 45 | 9 |
| Example 5 | 6½ | 2 | 45 | 8 |
| Example 6 | 6½ | 4 | 45 | 9 |
| Example 7 | 6½ | 3 | 45 | 9 |
| Example 8 | 6½ | 3 | 45 | 9 |
| Example 9 | 6½ | 3 | 45 | 9 |
| Example 10 | 6½ | 3 | 45 | 9 |
| Example 11 | 6½ | 3 | 45 | 3 |
| Example 12 | 6½ | 2 | 45 | 3 |

We claim:

1. A method for preparing a granular thermosetting molding composition including a novolak phenolic resin with modified surface characteristics, which comprises forming said molding composition into granules of from 2 to 8 mm in size and mixing said granules with an amount of from 0.5 to 3 wt.%, based on the weight of the granules, of one or more substances selected from the group consisting of acetone, phenol, aniline and reaction products of a styrene with phenol, wherein said reaction products are obtained by reacting phenol and styrene in the presence of an acid catalyst and have a density at 25° C. of from 1.080 to 1.087, a refractive index $N_D^{25}$ of from 1.577 to 1.584 and a viscosity at 25° C. of from 50 to 62 cps, at a temperature such as to maintain said substances in liquid form and for a period such as to ensure absorption of said substances by said granules, whereby the surface of said granules is modified, without altering other characteristics of the granules, to render the granules free from a tendency to release dust during handling.

2. The method of claim 1, wherein said molding composition further includes from 15 to 50 wt.% of novolak phenolic resin, from 3 to 10 wt.% of hexamine, from 0.5 to 2 wt.% of alkaline earth metal oxide and one or more inert fillers, based on the weight of the composition.

3. The method of claim 1, wherein said amount of said acetone is from 1 to 1.5 wt.%, based on the weight of the granules.

4. The method of claim 1, wherein the surface modified granules are transformable by molding into manufactured articles free from surface defects.

5. The method of claim 1, wherein said mixing is at 20°–30° C. for 5–30 minutes.

* * * * *